US012715403B2

(12) United States Patent
Shibata

(10) Patent No.: US 12,715,403 B2
(45) Date of Patent: Aug. 25, 2026

(54) BRAKE DEVICE FOR VEHICLE

(71) Applicant: DENSO CORPORATION, Kariya-city (JP)

(72) Inventor: Yusuke Shibata, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 19/065,771

(22) Filed: Feb. 27, 2025

(65) Prior Publication Data

US 2025/0196823 A1 Jun. 19, 2025

Related U.S. Application Data

(63) Continuation of application No. PCT/JP2023/029669, filed on Aug. 17, 2023.

(30) Foreign Application Priority Data

Sep. 1, 2022 (JP) ................................ 2022-139250

(51) Int. Cl.
*B60T 8/172* (2006.01)
*B60T 13/74* (2006.01)

(52) U.S. Cl.
CPC ............ *B60T 8/172* (2013.01); *B60T 13/741* (2013.01); *B60T 2250/04* (2013.01)

(58) Field of Classification Search
CPC .... B60T 8/172; B60T 13/741; B60T 2250/04; B60T 8/17; B60T 13/74
See application file for complete search history.

(56) References Cited

U.S. PATENT DOCUMENTS

2016/0091039 A1* 3/2016 Masuda ................ F16D 55/225
188/72.1

FOREIGN PATENT DOCUMENTS

JP 2024-034766 A 3/2024

OTHER PUBLICATIONS

U.S. Appl. No. 19/065,818 and its entire file history.
U.S. Appl. No. 19/041,617 and its entire file history.
U.S. Appl. No. 19/079,122 and its entire file history.
U.S. Appl. No. 19/079,117 and its entire file history.

* cited by examiner

*Primary Examiner* — Xiao En Mo
(74) *Attorney, Agent, or Firm* — Precision Patents, P.C.

(57) ABSTRACT

A relationship between a torque of a motor and a braking force generated in the electric brakes has a hysteresis characteristic. When the torque increases, the braking force increases along a positive efficiency line, and when the torque decreases, the braking force decreases along an inverse efficiency line. A prediction unit predicts a change in the required braking force from the present onwards. An operating point adjuster stores a maximum torque on the positive efficiency line and a minimum torque on the inverse efficiency line corresponding to the maintained braking force. The operating point adjuster adjusts an operating point that maintains the braking force in an adjustment zone between the minimum torque and the maximum torque, based on a prediction information from the prediction unit. The torque command calculation unit calculates a torque command value for the motor at the operating point adjusted by the operating point adjuster.

10 Claims, 9 Drawing Sheets

400
BRAKING FORCE CONTROL UNIT
40
TORQUE COMMAND VALUE
50
CURRENT COMMAND VALUE
55
REQUIRED BRAKING FORCE
TORQUE COMMAND CALCULATION
Trq*
CURRENT COMMAND CALCULATION
I*
INVERTER
15
DRIVE CURRENT
72
θ
ANGLE (POSITION) SENSOR
MOTOR
60
73
X
STROKE (POSITION) SENSOR
LINEAR MOTION MECHANISM
85
71
F
LOAD SENSOR
DISC
PAD
CALIPER
87
86
ELECTRIC BRAKE
88
IIIa
81, 82, 83, 84

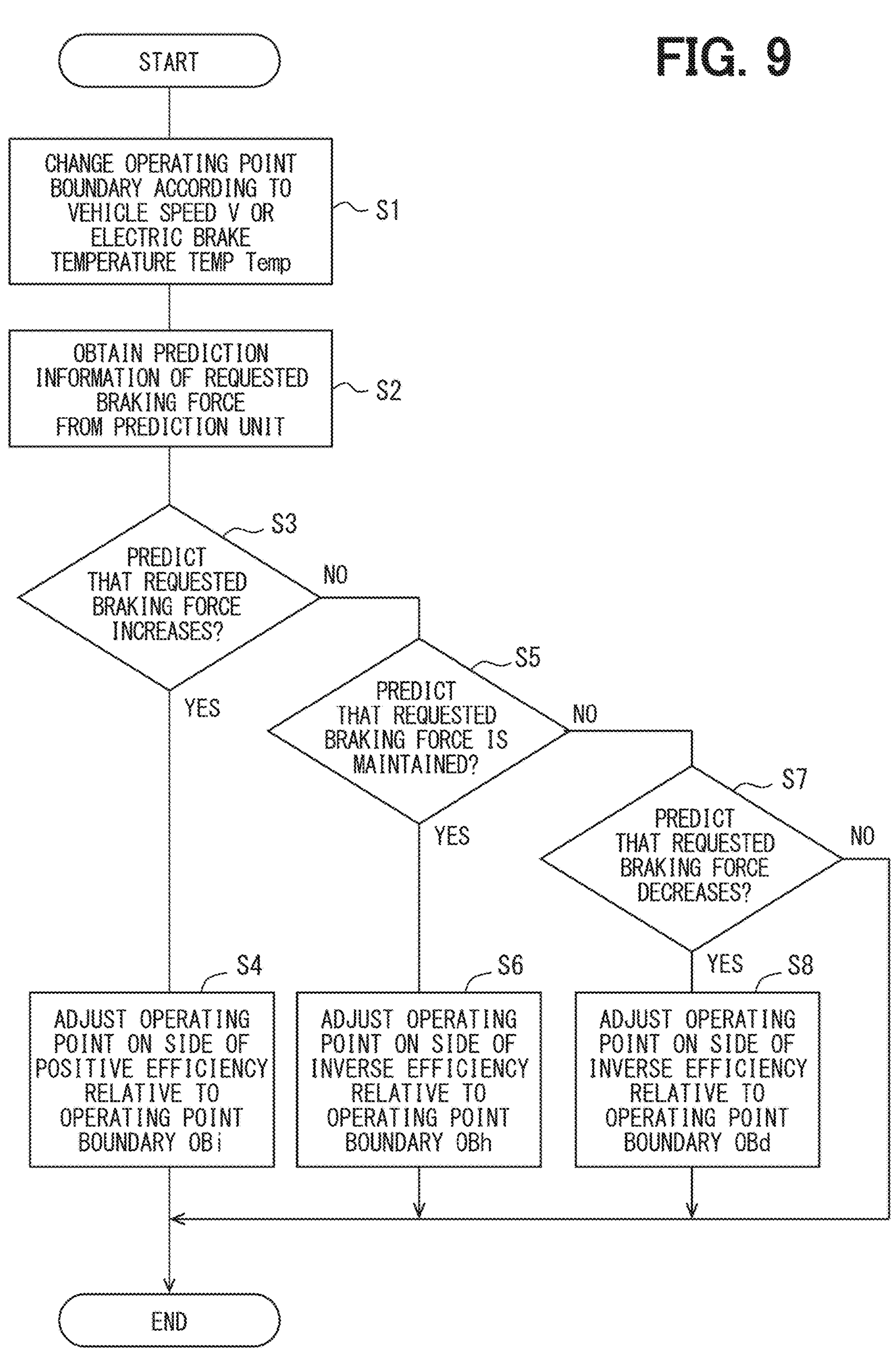
FIG. 9
START
CHANGE OPERATING POINT BOUNDARY ACCORDING TO VEHICLE SPEED V OR ELECTRIC BRAKE TEMPERATURE TEMP Temp
S1
OBTAIN PREDICTION INFORMATION OF REQUESTED BRAKING FORCE FROM PREDICTION UNIT
S2
S3
PREDICT THAT REQUESTED BRAKING FORCE INCREASES?
NO
YES
S5
PREDICT THAT REQUESTED BRAKING FORCE IS MAINTAINED?
NO
YES
S7
PREDICT THAT REQUESTED BRAKING FORCE DECREASES?
NO
YES
S4
ADJUST OPERATING POINT ON SIDE OF POSITIVE EFFICIENCY RELATIVE TO OPERATING POINT BOUNDARY OBi
S6
ADJUST OPERATING POINT ON SIDE OF INVERSE EFFICIENCY RELATIVE TO OPERATING POINT BOUNDARY OBh
S8
ADJUST OPERATING POINT ON SIDE OF INVERSE EFFICIENCY RELATIVE TO OPERATING POINT BOUNDARY OBd
END

BRAKE DEVICE FOR VEHICLE

CROSS REFERENCE TO RELATED APPLICATIONS

This application is a continuation application of International Patent Application No. PCT/JP2023/029669 filed on Aug. 17, 2023, which designated the U.S. and based on and claims the benefits of priority of Japanese Patent Application No. 2022-139250 filed on Sep. 1, 2022. The entire disclosure of all of the above applications is incorporated herein by reference.

TECHNICAL FIELD

The present disclosure relates to a brake device for vehicle.

BACKGROUND

Conventionally, in an electric brake device for a vehicle in which a relationship between a motor torque and a pressing force applied to a brake disc from a motion conversion mechanism has a hysteresis characteristic, a technique is known for controlling a drive of the motor so that a magnitude of the pressing force reaches a target value.

SUMMARY

An object of the present disclosure is to provide a brake device for a vehicle that is capable of adjusting a balance between an effect of reducing current while maintaining the braking force and a responsiveness when switching from a maintaining operation to a braking force increasing operation.

The brake device for vehicle in the present disclosure is mounted on a vehicle in which multiple electric brakes are provided on each wheel, and convert the torque output by a motor into a linear force by a linear mechanism and generate the braking force pressed against the corresponding wheel.

The brake device for vehicle includes a braking force control unit that has a torque command calculation unit and a current command calculation unit and controls the braking force generated by each electric brake. The torque command calculation unit calculates a torque command value for the motor based on a required braking force commanded from an external source. The current command calculation unit calculates a current command value for supplying current to the motor based on the torque command value.

A relationship between the torque of the motor and the braking force generated by the electric brake has a hysteresis characteristics in which, as the torque increases, the braking force increases along a positive efficiency line, as the torque decreases from a turning value where the torque changes from increasing to decreasing to a maintaining critical value, the braking force is maintained constant, and as the torque decreases from the maintaining critical value, the braking force decreases along the inverse efficiency line.

The torque command calculation unit includes a prediction unit and an operating point adjuster. The prediction unit predicts a change in the required braking force from the present onward.

The operating point adjuster stores a maximum torque on the positive efficiency line and a minimum torque on the inverse efficiency line corresponding to the maintained braking force, and adjusts the operating point that maintains the braking force in an adjustment zone between the minimum torque and the maximum torque based on prediction information from the prediction unit. The torque command calculation unit calculates a torque command value for the motor at the operating point adjusted by the operating point adjuster.

BRIEF DESCRIPTION OF THE DRAWINGS

The above and other objects, features and advantages of the present disclosure will become more apparent from the following detailed description made with reference to the accompanying drawings. In the drawings:

FIG. 9 is a flowchart of a process for adjusting an operating point.

DETAILED DESCRIPTION

Figure 1:
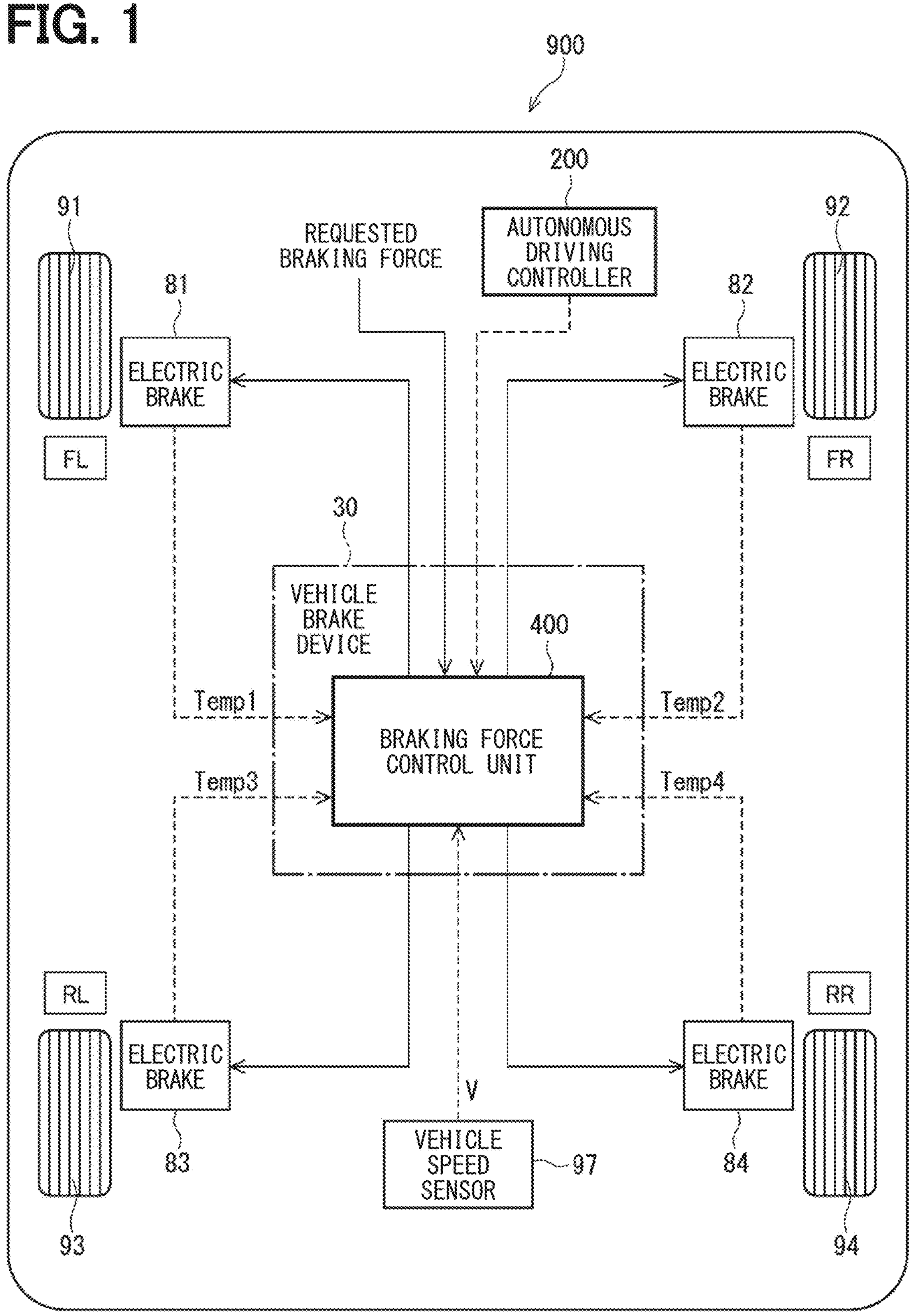
FIG. 1 is a diagram illustrating a configuration of a vehicle with which a brake device for a vehicle according to one embodiment is equipped.

In assumable example of an electric brake device for a vehicle in which a relationship between a motor torque and a pressing force applied to a brake disc from a motion conversion mechanism has a hysteresis characteristic, a technique is known for controlling a drive of the motor so that a magnitude of the pressing force reaches a target value. For example, in the electric brake device, a motor control device controls a drive current of the motor based on the magnitude of the pressing force detected by a load sensor. The relationship between the motor torque and the pressing force has a hysteresis characteristic. When the pressing force is applied to and maintained on the brake disc, this motor control device increases the motor torque along a positive efficiency line until the pressing force rises to a predetermined value greater than a target value, and then decreases the motor torque along an inverse efficiency line until the pressing force decreases to the target value.

In this specification, a vertical axis of a hysteresis diagram is described as "correlation amount of braking force." The pressing force detected by a load sensor corresponds to an actual braking force, which is a braking force actually output by an electric brake. Moreover, a load command value corresponds to a required braking force. In the conventional technology, an operating point is shifted from the positive efficiency line to the inverse efficiency line to maintain the braking force, thereby making it possible to reduce the current that drives the motor while the braking force is being maintained.

The assumable example describes an operation of increasing the braking force and then maintaining it, but does not describe an operation of decreasing the braking force and then maintaining it, or an operation of switching from a decrease to an increase in braking force. In the operation of reducing and then maintaining the braking force, it is estimated that the braking force will be maintained at an operating point on an inverse efficiency line as a matter of course. When switching from a maintaining operation at an operating point on the inverse efficiency line to a braking force increasing operation, a torque change equivalent to a width between the positive efficiency line and the inverse efficiency line is required, resulting in a response delay.

An object of the present disclosure is to provide a brake device for a vehicle that is capable of adjusting a balance between an effect of reducing current while maintaining the braking force and a responsiveness when switching from a maintaining operation to a braking force increasing operation.

The brake device for vehicle in the present disclosure is mounted on a vehicle in which multiple electric brakes are provided on each wheel, and convert the torque output by a motor into a linear force by a linear mechanism and generate the braking force pressed against the corresponding wheel.

The brake device for vehicle includes a braking force control unit that has a torque command calculation unit and a current command calculation unit and controls the braking force generated by each electric brake. The torque command calculation unit calculates a torque command value for the motor based on a required braking force commanded from an external source. The current command calculation unit calculates a current command value for supplying current to the motor based on the torque command value.

A relationship between the torque of the motor and the braking force generated by the electric brake has a hysteresis characteristics in which, as the torque increases, the braking force increases along a positive efficiency line, as the torque decreases from a turning value where the torque changes from increasing to decreasing to a maintaining critical value, the braking force is maintained constant, and as the torque decreases from the maintaining critical value, the braking force decreases along the inverse efficiency line.

The torque command calculation unit includes a prediction unit and an operating point adjuster. The prediction unit predicts a change in the required braking force from the present onward.

The operating point adjuster stores a maximum torque on the positive efficiency line and a minimum torque on the inverse efficiency line corresponding to the maintained braking force, and adjusts the operating point that maintains the braking force in an adjustment zone between the minimum torque and the maximum torque based on prediction information from the prediction unit. The torque command calculation unit calculates a torque command value for the motor at the operating point adjusted by the operating point adjuster.

Depending on a vehicle state, there are cases where improving responsiveness in switching from a maintaining operation to an increasing operation takes priority over reducing the current while the braking force is being maintained. In this case, when the prediction unit predicts that the required braking force will increase within the predicted time from the present, the operating point adjuster maintains the braking force at an operating point on a side of the positive efficiency line relative to the operating point boundary at the time of the predicted increase in the adjustment zone. It is possible to reduce a response delay when switching from maintaining the braking force to increasing the braking force.

Hereinafter, a brake device for a vehicle according to one embodiment of the present disclosure will be described with reference to the drawings. The brake device for vehicle in the present embodiments is mounted on a vehicle in which multiple electric brakes are provided on each wheel, and convert the torque output by a motor into a linear force by a linear mechanism and generate the braking force pressed against the corresponding wheel. The brake device for the vehicle includes a braking force control unit that controls a braking force generated by each of the electric brakes.

Vehicle Configuration

The configurations of a vehicle 900 on which the brake device 30 for the vehicle of the present embodiment is mounted and electric brakes 81 to 84 will be described with reference to FIGS. 1 to 3B. As shown in FIG. 1, the vehicle 900 is a four-wheel vehicle having two rows of left and right pairs of wheels 91, 92, 93, 94 in a front-rear direction. The left and right wheels 91, 92 at the front row may also be noted as “FL” and “FR”, respectively. The left and right wheels 93, 94 at the rear row may also be noted as “RL” and “RR”, respectively.

The electric brakes 81, 82, 83, 84 are provided for the respective wheels 91, 92, 93, 94. In other words, four electric brakes are provided in this example. Hereinafter, four consecutive reference numerals will be appropriately abbreviated to “wheels 91 to 94” and “electric brakes 81 to 84” in some occasions. The same shall apply to the symbols “electric brake temperatures Temp1 to Temp4” described below.

The brake device 30 for the vehicle includes a braking force control unit 400. The braking force control unit 400 controls the braking forces generated by the electric brakes 81 to 84 based on a required braking force commanded from an outside. The required braking force is commanded by the driver’s brake operation, a braking signal from a driving support device, or the like.

The braking force control unit 400 of the present embodiment obtains a vehicle speed V from a vehicle speed sensor 97, and obtains the electric brake temperatures Temp1 to Temp4 from the electric brakes 81 to 84. The electric brake temperatures Temp1 to Temp4 are detected by, for example, a temperature sensor. Alternatively, the electric brake temperatures Temp1 to Temp4 may be calculated based on an integrated power value of each electric brake 81 to 84 when effects of outside temperature and vehicle exhaust heat are equivalent in each electric brake 81 to 84.

In addition, the braking force control unit 400 of the present embodiment acquires information related to autonomous driving from an autonomous driving controller 200. For example, when the vehicle is braking while traveling downhill, the autonomous driving controller 200 notifies the driver that a gradient of the downhill slope ahead is getting steeper, gradual, or transitioning to an uphill slope, or that the vehicle is stopped at a traffic light. As will be described later, the braking force control unit 400 predicts the changes in the required braking force from the present onward based on the autonomous driving information from the autonomous driving controller 200, other camera and map information, and the like.

Figure 2:
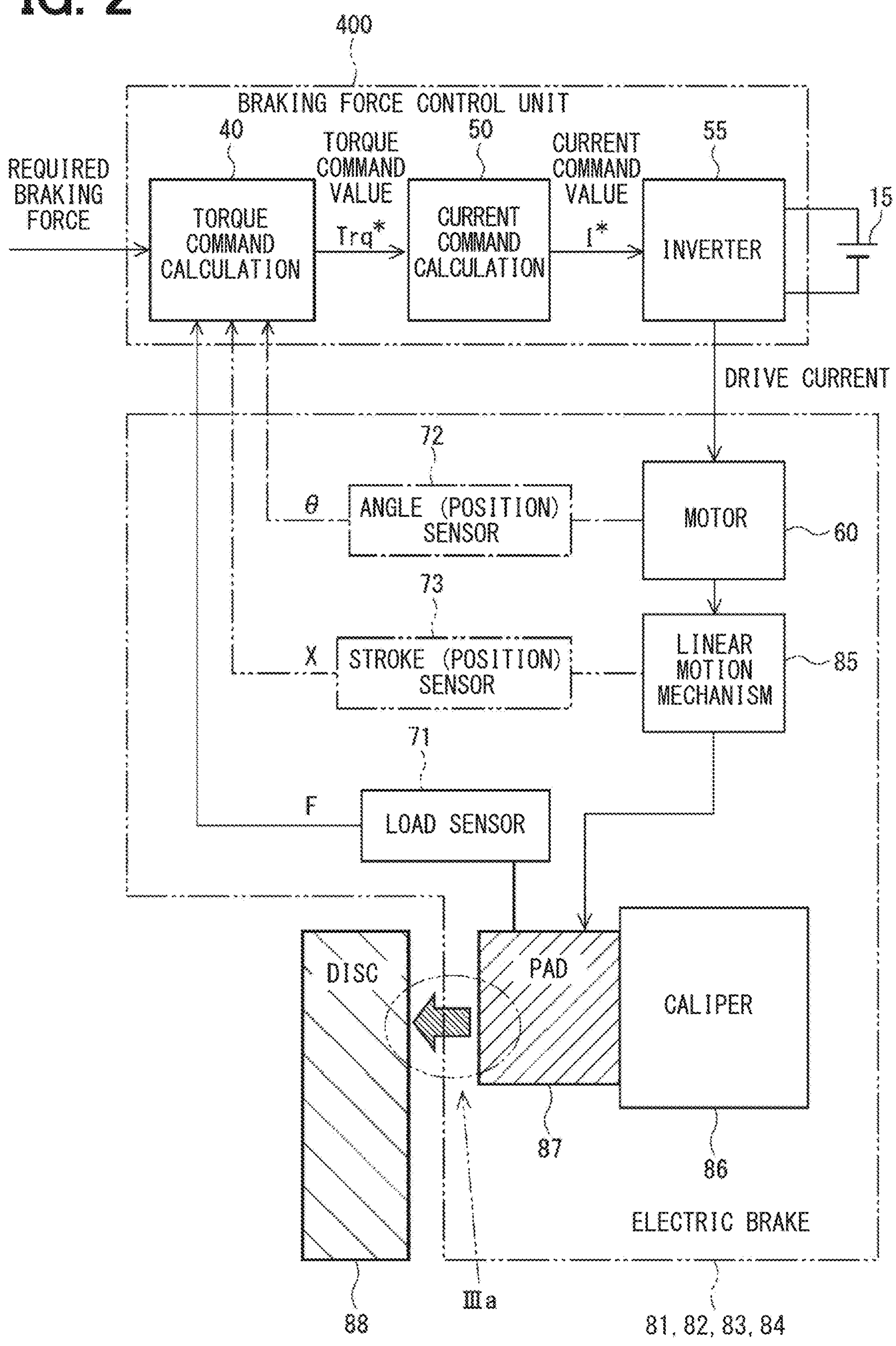
FIG. 2 is a block diagram of a braking force control of an electric brake corresponding to each wheel.

In the present embodiment, the control configurations of the electric brakes 81 to 84 are the same. FIG. 2 illustrates the control configuration of the electric brakes by the braking force control unit 400, taking any one of the electric brakes 81 to 84 as an example.

Each of the electric brakes 81 to 84 includes a motor 60, a linear motion mechanism 85, and a caliper 86. The motor 60 is, for example, a permanent magnet type three-phase brushless motor, and outputs torque in response to a drive current supplied from the braking force control unit 400. The linear motion mechanism 85 is an actuator that converts the output rotation of the motor 60 into linear motion while decelerating the output rotation. The rotation angle 0 of the motor 60 and the stroke X of the linear motion mechanism 85 are proportional to each other. In this manner, each of the electric brakes 81 to 84 converts the torque output by the motor 60 into linear force by the linear motion mechanism 85, and generates a braking force to press against the corresponding wheel 91 to 94.

The output torque of the motor 60 operates a pad 87 of a caliper 86 via the linear motion mechanism 85. The pad 87 moves and presses against the disks 88 of each wheel 91 to 94 to generate a braking force through friction. Furthermore, the pad 87 separates from the disk 88, and the braking force is released.

Figure 3A:
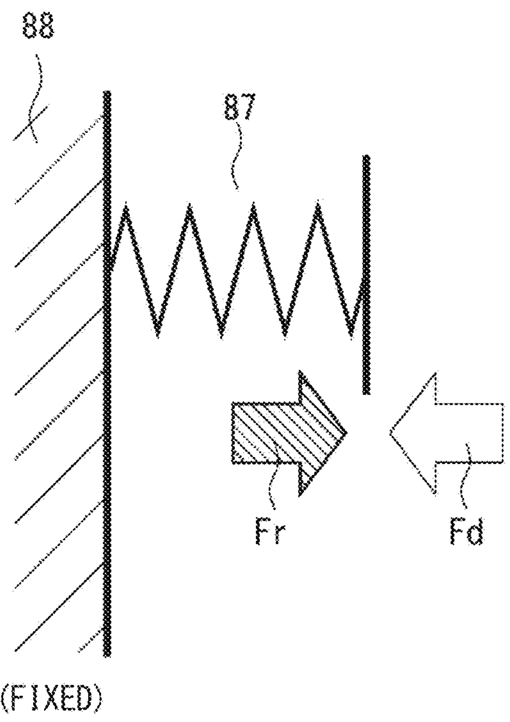
FIG. 3A is a schematic diagram of an electric brake pad.
Figure 3B:
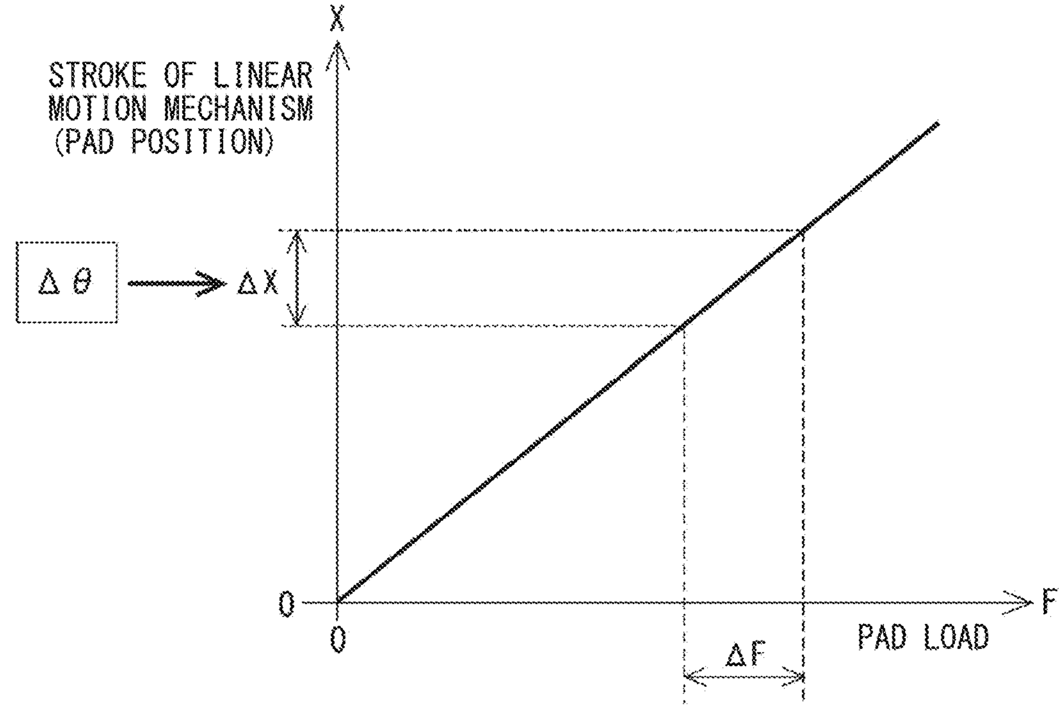
FIG. 3B is a characteristic diagram of a pad load and a pad position.

With reference to FIGS. 3A and 3B, the characteristics of the pad 87 of the electric brakes 81 to 81 shown in a portion IIIa of FIG. 2 will be supplemented. As shown in FIG. 3A, the pad 87 has spring-like characteristics, and a pressing force Fd by the linear motion mechanism 85 and a reaction force Fr according to the amount of deformation act in opposite directions. As shown in FIG. 3B, a pad position X based on the stroke of the linear motion mechanism 85 and a pad load F are approximately proportional. When the pad position changes by ΔX due to a change 40 in the rotation angle of the motor 60, the pad load changes by ΔF. A symbol "ΔF" indicates the change in load only in FIG. 3B. The symbol "ΔF" has a different meaning from "ΔF" used in FIG. 5 and subsequent figures, which indicates a load deviation between the load command value and the actual load.

Returning to FIG. 2, the braking force control unit 400 includes a torque command calculation unit 40, a current command calculation unit 50, and an inverter 55. The torque command calculation unit 40 calculates a torque command value Trq* of the motor 60 based on a required braking force commanded from an external source. The current command calculation unit 50 calculates a current command value I* to be supplied to the motor 60 based on the torque command value.

The inverter 55 converts the DC power of the battery 15 into AC power, and supplies the AC power according to the current command value I* to the motor 60. A detailed configuration such as current feedback from the current command calculation unit 50 to the inverter 55 is omitted. According to a general motor control technique, for example, the inverter 55 performs a switching operation in accordance with a switching signal by PWM control.

In the basic embodiment, the electric brakes 81 to 84 are provided with a load sensor 71 that detects an actual load F, which is the braking load actually applied to the wheels 91 to 94. The actual load F detected by the load sensor 71 is input to the torque command calculation unit 40. The torque command calculation unit 40 performs load control so as to bring the actual load F closer to a load command value calculated based on the required braking force, and calculates a torque command value Trq *. In the description of one embodiment, it is assumed that the torque command calculation unit 40 performs load control.

However, in other embodiments, the electric brakes 81 to 84 may be equipped with an angle sensor 72 shown by a dashed line or a stroke sensor 73 shown by a dashed double-dashed line. The angle sensor 72 detects an actual angle θ, which is an actual rotation angle of the motor 60. The stroke sensor 73 detects an actual stroke X, which is the actual stroke of the linear motion mechanism 85.

The angle sensor 72 and the stroke sensor 73 are collectively referred to as the "position sensor", and the actual angle θ and the actual stroke X are collectively referred to as the "actual position". The actual positions θ, X detected by the position sensors 72, 73 are input to the torque command calculation unit 40. Instead of or in addition to the load control, the torque command calculation unit 40 may perform the position control so as to bring the actual positions θ, X closer to position command values calculated based on the required braking force, and calculate the torque command value Trq*.

Next, the relationship between the motor torque and the braking force in the electric brake having this configuration will be described with reference to FIG. 4. The braking force is related to the brake pad load. Hereinafter, the term "torque" simply means the torque output by the motor 60, and the term "load" simply means the pressure load applied by the pad 87.

A relationship between the torque of the motor 60 and the braking forces generated in the electric brakes 81 to 84 has a hysteresis characteristic. When the torque increases, the braking force increases along the positive efficiency line. When the torque decreases from a turning value Tconv, where the torque changes from increasing to decreasing, to a maintaining critical value Tcr, the braking force is maintained constant. When the torque decreases from the maintaining critical value Tcr, the braking force decreases along the inverse efficiency line.

In the conventional technology, the torque of the motor is increased until the magnitude of the load detected by the load sensor reaches "a value that is greater than the target value F* by a predetermined offset value dF". Thereafter, the drive current of the motor is controlled so as to reduce the motor torque until the magnitude of the load detected by the load sensor reaches the target value F*. In the process of reducing the torque of the motor, the load F, i.e., the braking force, is maintained.

An operation that increases the torque and braking force along the positive efficiency line is defined as an "increasing operation", an operation that maintains the braking force at any operating point between the positive efficiency line and the inverse efficiency line is defined as a "maintaining operation", and an operation that decreases the torque and braking force along the inverse efficiency line is defined as a "decreasing operation".

In the conventional technology, when switching from a maintaining operation at an operating point on the inverse efficiency line to a braking force increasing operation, a torque change equivalent to a width between the positive efficiency line and the inverse efficiency line is required, resulting in a response delay. Therefore, the brake device 30 for the vehicle of the present embodiment aims to make it possible to adjust the balance between the current reduction effect while maintaining the braking force and the responsiveness when switching from the maintaining operation to the braking force increasing operation, depending on the vehicle condition, etc.

One Embodiment

Figure 5:
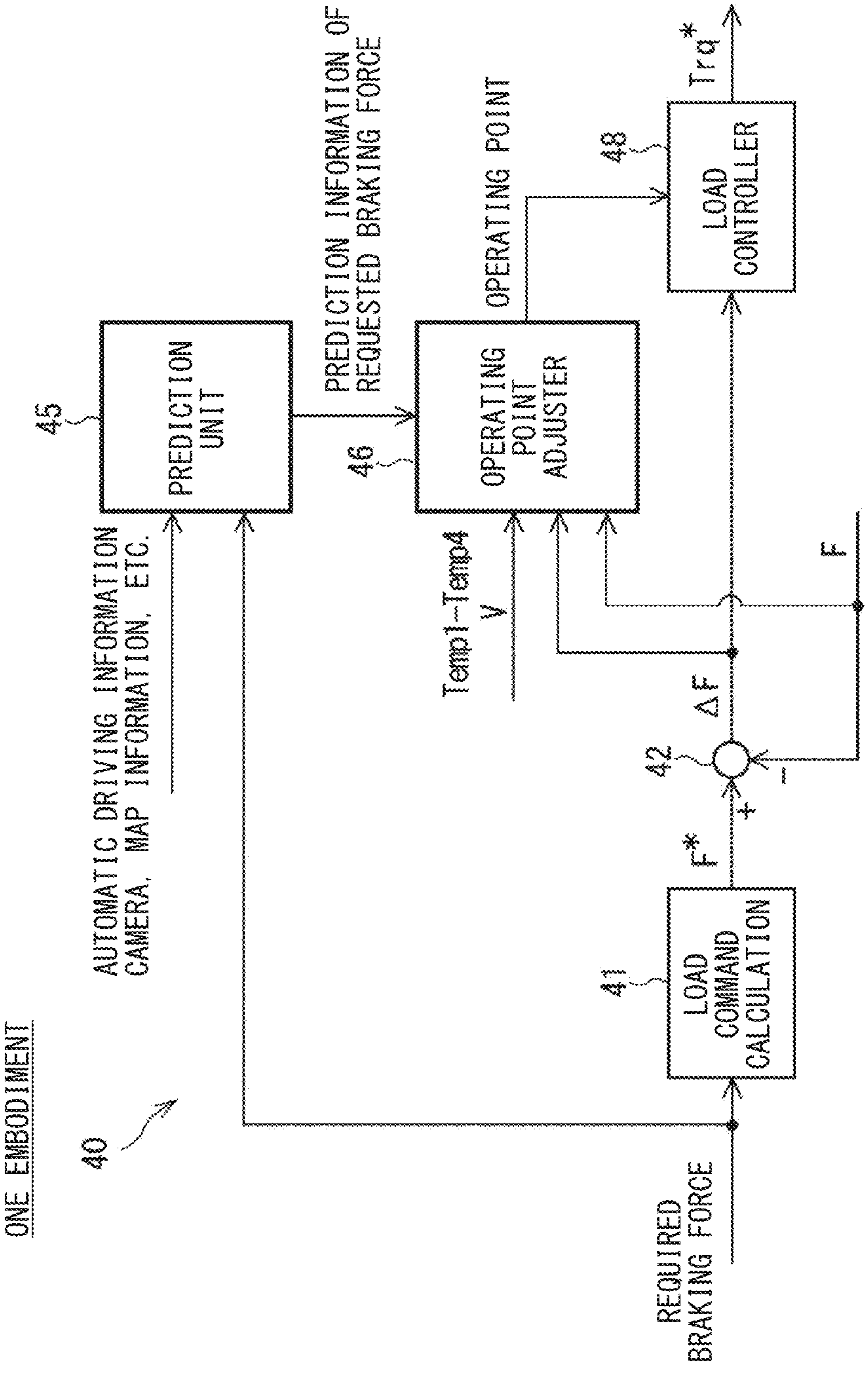
FIG. 5 is a block diagram of a torque command calculation unit according to one embodiment.

FIG. 5 shows a block diagram of the torque command calculation unit 40 according to one embodiment. The torque command calculation unit 40 includes a load command calculation unit 41, a load deviation calculator 42, a prediction unit 45, an operating point adjuster 46, and a load controller 48.

The load command calculation unit 41 calculates a load command value F* based on the required braking force. The load deviation calculator 42 calculates a load deviation ΔF (=F*−F) between the actual load F detected by the load sensor 71 and the load command value F*, and outputs the load deviation ΔF to the load controller 48.

The prediction unit 45 acquires the current required braking force, as well as autonomous driving information from the autonomous driving controller 200 and other information including camera and map, etc. and based thereon predicts changes in the required braking force from the present onward. The prediction unit 45 notifies the operating point adjuster 46 of prediction information regarding changes in the required braking force from the present onward.

For example, assume that a vehicle is traveling autonomously downhill while maintaining braking force at a constant deceleration, and information is notified based on camera footage and map information that the road ahead is a steeper downhill slope than the slope on which the vehicle is currently traveling. In this case, the braking force needs to be increased to keep the deceleration constant. Therefore, the prediction unit 45 predicts that the required braking force will increase from the present onward.

Conversely, when the vehicle is traveling autonomously downhill at a constant deceleration while maintaining braking force, if information is received that the road ahead is a downhill or uphill road with a gentler gradient than the current driving point, the prediction unit 45 predicts that the required braking force will decrease from the present onward. In addition, in the vehicle with ACC (adaptive cruise control), when the vehicle ahead decelerates, the prediction unit 45 predicts that the required braking force will increase from the present onward. When the brake is released immediately before the vehicle stops and the vehicle moves slightly, the prediction unit 45 predicts that the required braking force will decrease from the present time onwards.

In this way, the prediction unit 45 is not limited to the example of predicting a change in the required braking force based on vehicle behavior information acquired from the outside, but may also be configured to receive the result of a prediction of a change in the required braking force by the autonomous driving controller 200 or the like, and issue a command to the operating point adjuster 46.

The operating point adjuster 46 acquires the actual load F, the load deviation ΔF, the electric brake temperatures Temp1 to Temp4, and the vehicle speed V. Based on the actual load F and the load deviation ΔF, the current operating point on the map and the direction of increase and decrease in the braking force are estimated. The operating point adjuster 46 also acquires autonomous driving information from the autonomous driving controller 200, as well as other information including camera and map, etc.

Figure 4:
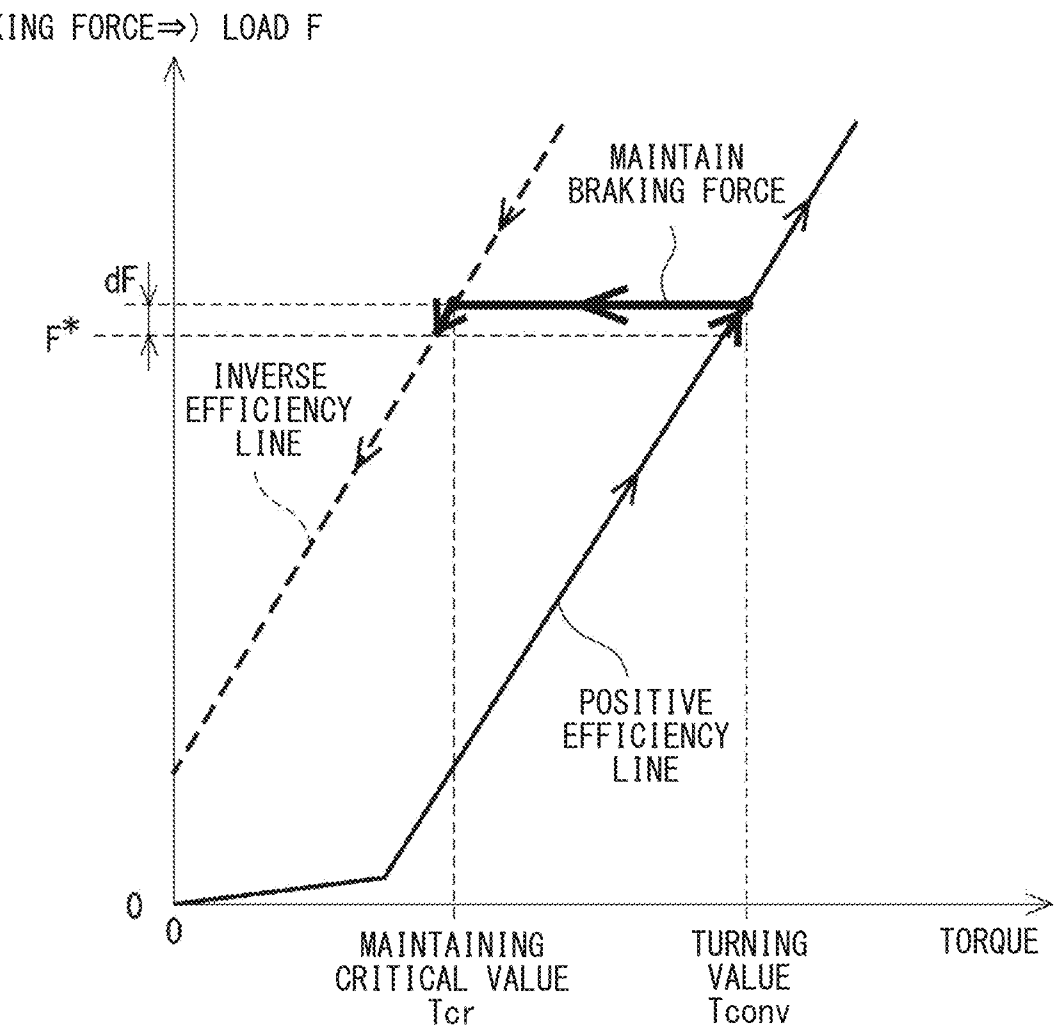
FIG. 4 is a diagram showing hysteresis characteristics of a motor torque and a braking force.

The operating point adjuster 46 stores the torque-braking force relationship shown in FIG. 4 as a map. When the braking force is maintained, the operating point adjuster 46 stores a maximum torque on the positive efficiency line and a minimum torque on the inverse efficiency line corresponding to the maintained braking force based on the map. Furthermore, the operating point adjuster 46 adjusts the operating point that maintains the braking force in an adjustment zone between the minimum torque and the maximum torque, based on the prediction information from the prediction unit 45. For example, when the prediction unit 45 predicts that the required braking force will increase after the present time, the operating point adjuster 46 shifts the operating point toward the positive efficiency line. The operation of the operating point adjuster 46 will be described in detail below with reference to FIGS. 6 to 9.

The load controller 48 calculates the torque command value (Trq*) primarily to reduce the load deviation (ΔF) to zero, thereby bringing the actual load (F) closer to the load command value (F*). Furthermore, the load controller 48 calculates the torque command value Trq* at the operating point adjusted by the operating point adjuster 46 while the braking force is being maintained.

Figure 6:
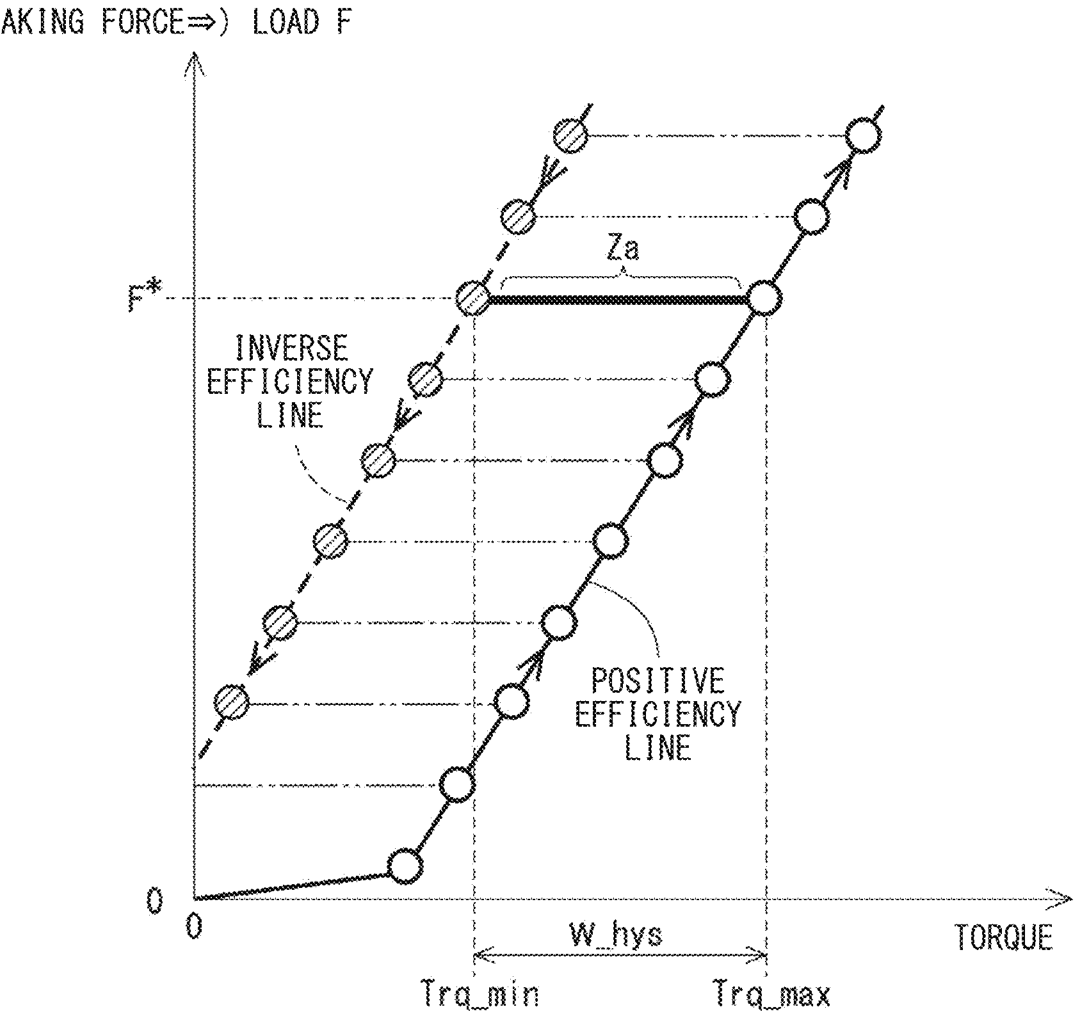
FIG. 6 is a diagram for explaining calculation of maximum torque and minimum torque.

A storage of the maximum torque Trq_max and the minimum torque Trq_min and the calculation of the hysteresis width W_hys by the operating point adjuster 46 will be described with reference to FIG. 6. In the torque-braking force map of FIG. 6, a white circle on the positive efficiency line indicates maximum torque Trq_max, and a hatched circle on the inverse efficiency line indicates minimum torque Trq_min. The operating point adjuster 46 stores the maximum torque Trq_max and the minimum torque Trq_min corresponding to each load command value F*.

For example, during the manufacturing process or at the time of an initial operation, the operating point adjuster 46 changes the torque with respect to the load command value F*, such as "from 0 to maximum torque and from maximum torque to 0" and stores the maximum torque Trq_max and the minimum torque Trq_min. The map may be updated appropriately each time the power is turned on, each time work is performed, etc. In addition, when performing the maintaining operation in which an excess operation is performed on the load command value F* and then a return operation is performed, as in the conventional technology, the operating point adjuster 46 may store the torque values at the start of the excess operation and at the end of the return operation. In this case, it is efficient to not have to maintain the entire map.

A torque width from the minimum torque Trq_min to the maximum torque Trq_max is defined as the "hysteresis width W_hys." Moreover, a thick line between the minimum torque Trq_min and the maximum torque Trq_max is an adjustment zone Za of the operating point where the braking force is maintained. The operating point adjuster 46 adjusts the operating point at which the braking force is maintained in the adjustment zone Za based on the prediction information from the prediction unit 45.

Next, the adjustment of the operating point during the braking force maintaining operation will be described with reference to FIGS. 7 and 8. In the following description, "operating points close to the positive efficiency line" includes "operating points on the positive efficiency line", and "operating points close to the inverse efficiency line" includes "operating points on the inverse efficiency line". "Reducing the response delay" includes "reducing the response delay to zero." The operating point adjuster 46 recognizes a change in the required braking force at a predetermined prediction time from the present onward, based on the prediction information from the prediction unit 45.

A time when the required braking force is predicted to increase within a predicted time from the present time and to switch from the maintaining operation to the increasing operation is referred to as a "time of predicting increase." At the time of predicting increase, the operating point adjuster 46 maintains the braking force at an operating point close to the positive efficiency line, and thus the current reduction effect while maintaining the braking force decreases, but the response delay when switching to the increasing operation can be reduced.

On the other hand, a time when the required braking force is predicted to decrease within a predicted time from the present time and to switch from the maintaining operation to the decreasing operation is referred to as a "time of predicting decrease." At the time of predicting decrease, the operating point adjuster 46 maintains the braking force at an operating point close to the inverse efficiency line, thereby ensuring an optimal current reduction effect while maintaining the braking force and reducing the response delay when switching to the decrease operation.

A time when it is predicted that the required braking force will be maintained for a predicted time or longer from the present time is referred to as a "time of predicting maintain." Even at the time of predicting maintain, the operating point adjuster 46 maintains the braking force at an operating point close to the inverse efficiency line, thereby making it possible to preferably ensure the current reduction effect during maintaining.

Figure 7:
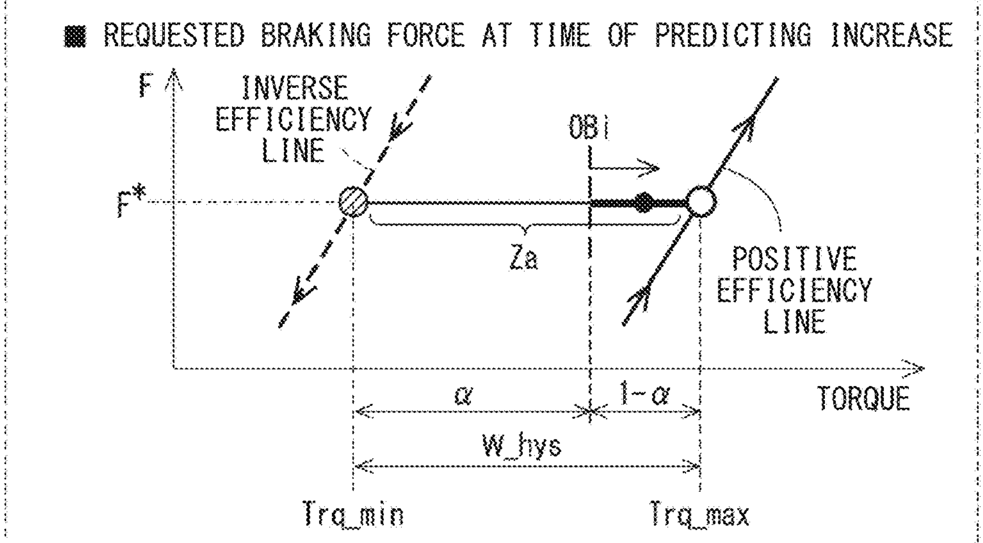
FIG. 7 is a diagram for explaining a setting of operating point boundaries and an adjustment of operating points when a required braking force is predicted to increase, be maintained, or decrease.
Figure 7:
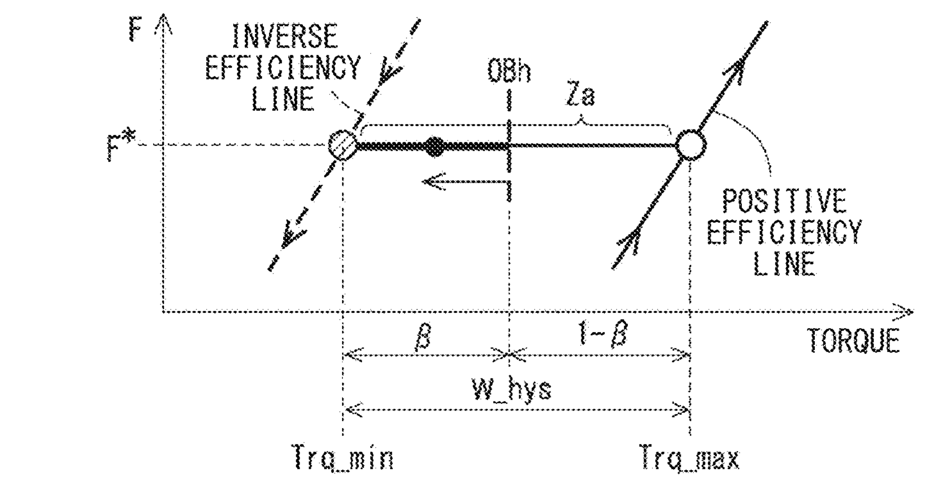
Figure 7:
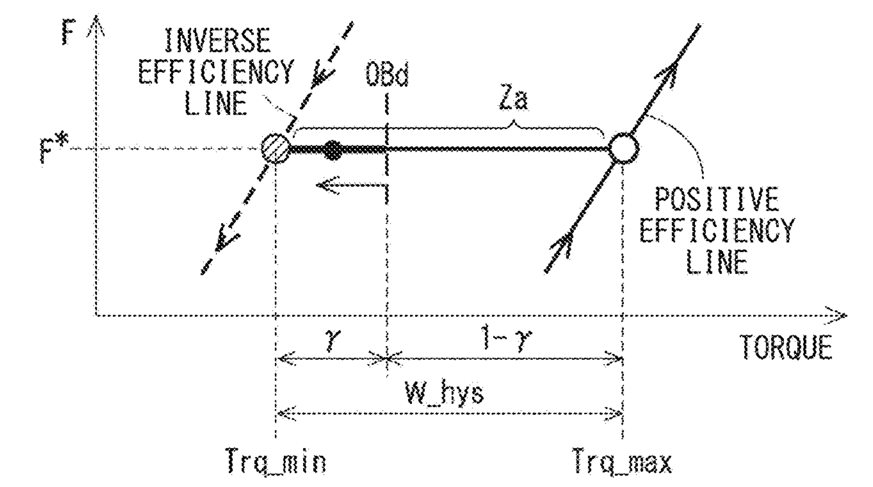

For example, the operating point adjuster 46 specifically adjusts the operating point using the configuration shown in FIG. 7. The operating point adjuster 46 sets, in the adjustment zone Za, an operating point boundary OBi at the time of predicting increase, an operating point boundary OBh at the time of predicting maintain, and an operating point boundary OBd at the time of predicting decrease. The operating point boundaries OBi, OBh, and OBd are expressed as follows using the minimum torque Trq_min corresponding to the load command value F*, the hysteresis width W_hys, and the boundary coefficients α, β, γ ($0 \le \alpha \le 1$, $0 \le \beta \le 1$, $0 \le \gamma \le 1$). When the boundary coefficients α, β, and γ are 0, the operating point is set on the inverse efficiency line, and when the boundary coefficients α, β, and γ are 1, the operating point is set on the normal efficiency line.

$$OBi = \text{Trq\_min} + \alpha \times \text{W\_hys}$$

$$OBh = \text{Trq\_min} + \beta \times \text{W\_hys}$$

$$OBd = \text{Trq\_min} + \gamma \times \text{W\_hys}$$

FIG. 7 shows the operating point boundaries OBi, OBh, and OBd in the cases where $\alpha > 0.5$, $\beta \sim 0.5$, and $\gamma < 0.5$. At the time of predicting increase, the operating point adjuster 46 maintains the braking force at an operating point on the side of the positive efficiency line relative to the operating point boundary OBi, thereby making it possible to reduce a response delay when switching to the increasing operation. In addition, at the time of predicting maintain and predicting decrease, the operating point adjuster 46 maintains the braking force at an operating point on the inverse efficiency line side with respect to the operating point boundary OBh and the operating point boundary OBd, respectively, thereby enabling the current reduction effect to be suitably ensured.

Figure 8:
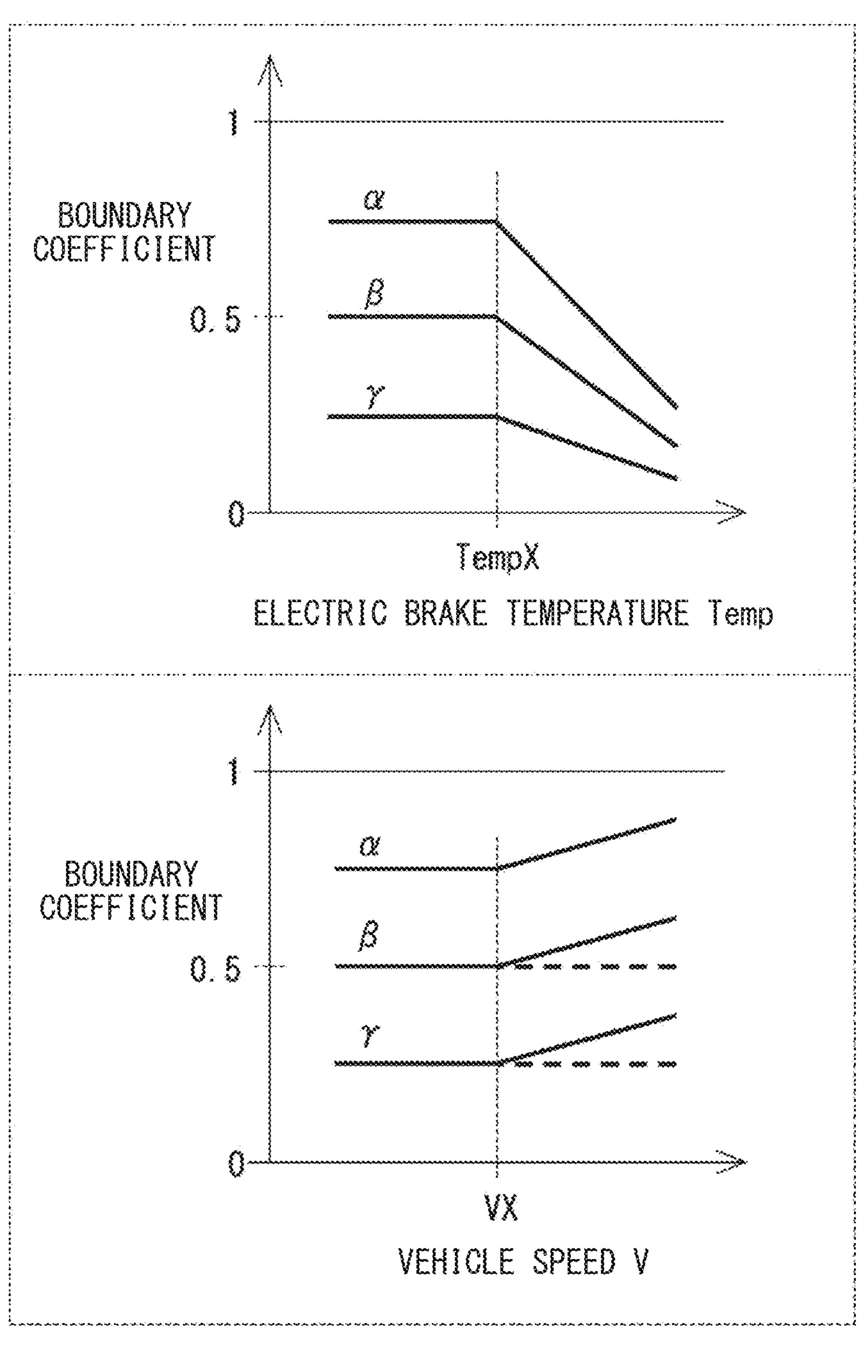
FIG. 8 is a diagram showing an example of changing a boundary coefficient according to an electric brake temperature and a vehicle speed.

As shown in FIG. 8, the operating point adjuster 46 may change the boundary coefficients α, β, and γ in accordance with at least one of the electric brake temperature Temp and the vehicle speed V and then change the operating point boundaries OBi, OBh, and OBd. Here, the electric brake temperature Temp is a representative value calculated as the maximum value or average value of the electric brake temperatures Temp1 to Temp4. Although in FIG. 8, a simple broken line characteristic is illustrated, a multi-step characteristic or a curved characteristic may be adopted. In addition, logic for determining the boundary coefficients α, β, and γ by arbitrating the degree of dependency on the electric brake temperature Temp and the degree of dependency on the vehicle speed V may be added.

In a high temperature range where the electric brake temperature Temp is equal to or higher than a temperature critical value TempX, there is a higher demand for reducing heat generated by current passing through the windings of the inverter 55 and the motor 60 to avoid breakdown of the elements, rather than for the response to switching to the braking force increasing operation. Therefore, it is preferable to reduce the boundary coefficients α, β, and γ to near zero.

On the other hand, in the high-speed range where the vehicle speed V is equal to or greater than a vehicle speed critical value VX, the impact of a delay in switching to the braking force increasing operation is large, so it is necessary to prioritize improving responsiveness over reducing the current during maintaining. In particular, at the time of predicting increase, it is preferable to increase the boundary coefficient a to close to 1 to minimize the response delay. If the prediction reliability at the time of predicting maintain and predicting decrease is high, the boundary coefficients β and γ may be constant regardless of the vehicle speed V, as shown by the dashed line. However, in preparation for unexpected sudden braking, the boundary coefficients β and γ may be changed to larger values when the vehicle speed V is equal to or greater than the vehicle speed critical value VX.

A process executed by the operating point adjuster 46 will now be described with reference to a flowchart of FIG. 9. In the following flowchart, a symbol S indicates a step. In S1, the operating point adjuster 46 changes the operating point boundaries OBi, OBh, OBd of the increasing operation, the maintaining operation, and the decreasing operation in response to the vehicle speed V or the electric brake temperature Temp. For example, the operating point adjuster 46 changes the boundary coefficients α, β, and γ in response to the electric brake temperature Temp or the vehicle speed V as shown in FIG. 8. The operating point boundary may be set to a fixed value regardless of the electric brake temperature Temp or the vehicle speed V.

In S2, the operating point adjuster 46 obtains prediction information of the required braking force from the prediction unit 45. When the prediction unit 45 predicts that the required braking force will increase within the prediction time from the present, a YES determination is made in S3. At this time, in S4, the operating point adjuster 46 maintains the braking force at an operating point on the side of the positive efficiency line relative to the operating point boundary OBi at the time of predicting increase in the adjustment zone Za.

When the prediction unit 45 predicts that the required braking force will be maintained for at least the predicted time from the present, a YES determination is made in S5. At this time, in S6, the operating point adjuster 46 maintains the braking force at an operating point on the side of the inverse efficiency line relative to the operating point boundary OBh at the time of predicted maintenance in the adjustment zone Za.

When the prediction unit 45 predicts that the required braking force will decrease within the prediction time from the present time, a YES determination is made in S7. At this time, in S8, the operating point adjuster 46 maintains the braking force at an operating point on the side of the inverse efficiency line relative to the operating point boundary OBd at the time of predicting decrease in the adjustment zone Za.

As described above, based on the prediction information by the prediction unit 45, the operating point adjuster 46 adjusts the operating point at which the braking force is maintained. It is possible to appropriately adjust the balance between the effect of reducing current during maintaining the brake force and the responsiveness when switching from the maintaining operation to the brake force increasing operation.

Other Embodiments

The vehicle on which the vehicle brake device of the present disclosure is mounted is not limited to a four-wheel vehicle having two rows of left and right wheels in the vehicle front-rear direction, and may be a vehicle having six or more wheels having three or more rows of wheels in the vehicle front-rear direction. In addition, the vehicle brake device of the present disclosure may be installed in a vehicle that does not have an autonomous driving controller 200.

(b) In the above embodiment, the torque command calculation unit 40 calculates the torque command value Trq* by the load control. However, in other embodiments, the torque command calculation unit 40 may calculate the torque command value Trq* by a position control. In this case, the braking force correlates with the positions θ and X, and the positions θ and X are used as the vertical axes of the hysteresis diagrams corresponding to FIG. 4, FIG. 6, etc.

(c) When adjusting the operating point, information on the electric brake temperature Temp or the vehicle speed V does not have to be used. Furthermore, for example, in areas where the influence of air temperature is greater than the influence of heat generated by current flow, the air temperature may be regarded as the electric brake temperature Temp.

The present disclosure should not be limited to the embodiment described above. Various other embodiments may be implemented without departing from the scope of the present disclosure.

The braking force controller and method described in the present disclosure may be implemented by a special purpose computer which is configured with a memory and a processor programmed to execute one or more particular functions embodied in computer programs of the memory. Alternatively, the braking force controller described in the present disclosure and the method thereof may be realized by a dedicated computer configured as a processor with one or more dedicated hardware logic circuits. Alternatively, the braking force controller and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A brake device for a vehicle mounted on a vehicle having a plurality of electric brakes that is provided on each wheel, convert torque output by a motor into linear force by a linear motion mechanism and press the corresponding wheels to generate braking force, the brake device for the vehicle, comprising:

a braking force control unit including a torque command calculation unit configured to calculate a torque command value for the motor based on a required braking force commanded from an external source, and a current command calculation unit configured to calculate a current command value for energizing the motor based on the torque command value, and that controls the braking force generated by each of the electric brakes; wherein a relationship between the torque of the motor and the braking force generated by the electric brake has a hysteresis characteristics in which, as the torque increases, the braking force increases along a positive efficiency line, as the torque decreases from a turning value where the torque changes from increasing to decreasing to a maintaining critical value, the braking force is maintained constant, and as the torque decreases from the maintaining critical value, the braking force decreases along an inverse efficiency line, the torque command calculation unit includes a prediction unit configured to predict a change in the required braking force from the present onward, and an operating point adjuster configured to store a maximum torque on the positive efficiency line and a minimum torque on the inverse efficiency line corresponding to a maintained braking force, and adjusts an operating point that maintains a braking force in an adjustment zone between the minimum torque and the maximum torque based on prediction information by the prediction unit, and the torque command calculation unit calculates a torque command value for the motor at the operating point adjusted by the operating point adjuster.

2. The brake device for the vehicle according to claim 1, wherein when the prediction unit predicts that the required braking force increases within a prediction time from the present, the operating point adjuster maintains the braking force at an operating point on a side of the positive efficiency line relative to an operating point boundary at the time of predicting increase in the adjustment zone.

3. The brake device for the vehicle according to claim 1, wherein when the prediction unit predicts that the required braking force is maintained for a predicted time or longer from the present, the operating point adjuster maintains the braking force at an operating point on a side of the inverse efficiency line relative to an operating point boundary at the time of predicting maintain in the adjustment zone.

4. The brake device for the vehicle according to claim 1, wherein when the prediction unit predicts that the required braking force decreases within a prediction time from the present, the operating point adjuster maintains the braking force at an operating point on a side of the inverse efficiency line relative to an operating point boundary at the time of predicting decrease in the adjustment zone.

5. The brake device for the vehicle according to claim 2, wherein the operating point adjuster changes the operating point boundary in response to at least one of a temperature of the electric brake and a vehicle speed.

6. A brake device for a vehicle mounted on a vehicle having a plurality of electric brakes that is provided on each wheel, convert torque output by a motor into linear force by a linear motion mechanism and press the corresponding wheels to generate braking force, the brake device for the vehicle, comprising:

a computer including a processor and a memory that stores instructions configured to, when executed by the processor, cause the processor to calculate a torque command value for the motor based on a required braking force commanded from an external source, calculate a current command value for energizing the motor based on the torque command value, and control the braking force generated by each of the electric brakes, wherein a relationship between the torque of the motor and the braking force generated by the electric brake has a hysteresis characteristics in which, as the torque increases, the braking force increases along a positive efficiency line, as the torque decreases from a turning value where the torque changes from increasing to decreasing to a holding critical value, the braking force is maintained constant, and as the torque decreases from the holding critical value, the braking force decreases along an inverse efficiency line, and the computer causes the processor to obtain a prediction information that predict a change in the required braking force from the present onward, store a maximum torque on the positive efficiency line and a minimum torque on the inverse efficiency line corresponding to a maintained braking force, and adjusts an operating point that maintains a braking force in an adjustment zone between the minimum torque and the maximum torque based on the prediction information, and calculate a torque command value for the motor at the adjusted operating point.

7. The brake device for the vehicle according to claim 6, wherein the computer causes the processor to maintain the braking force at an operating point on a side of the positive efficiency line relative to an operating point boundary at the time of predicting increase in the adjustment zone, when predicting that the required braking force increases within a prediction time from the present.

8. The brake device for the vehicle according to claim 6, wherein the computer causes the processor to maintain the braking force at an operating point on a side of the inverse efficiency line relative to an operating point boundary at the time of predicting maintain in the adjustment zone, when predicting that the required braking force is maintained for a predicted time or longer from the present.

9. The brake device for the vehicle according to claim 6, wherein the computer causes the processor to maintain the braking force at an operating point on a side of the inverse efficiency line relative to an operating point boundary at the time of predicting decrease in the adjustment zone, when predicting that the required braking force decreases within a prediction time from the present.

10. The brake device for the vehicle according to claim 7, wherein the computer causes the processor to change the operating point boundary in response to at least one of a temperature of the electric brake and a vehicle speed.

* * * * *